(12) United States Patent
Huang

(10) Patent No.: US 10,813,439 B2
(45) Date of Patent: Oct. 27, 2020

(54) CLIP OF SPRING PLATE TYPE

(71) Applicant: Yuh-Lin Huang, New Taipei (TW)

(72) Inventor: Yuh-Lin Huang, New Taipei (TW)

( * ) Notice: Subject to any disclaimer, the term of this patent is extended or adjusted under 35 U.S.C. 154(b) by 65 days.

(21) Appl. No.: 16/201,240

(22) Filed: Nov. 27, 2018

(65) Prior Publication Data

US 2020/0163443 A1    May 28, 2020

(51) Int. Cl.
*A45F 5/02* (2006.01)
*F16B 2/10* (2006.01)

(52) U.S. Cl.
CPC .................. *A45F 5/02* (2013.01); *F16B 2/10* (2013.01); *A45F 2200/055* (2013.01)

(58) Field of Classification Search
CPC .................. A45F 5/02; A45F 2200/055; Y10T 24/44479; Y10T 24/44444
See application file for complete search history.

(56) References Cited

U.S. PATENT DOCUMENTS

| | | | | |
|---|---|---|---|---|
| 1,768,936 A * | 7/1930 | Seghers | .................. | H01R 11/24 439/217 |
| 1,969,013 A * | 8/1934 | Jones | ........................ | C14B 1/26 24/347 |
| 4,701,983 A * | 10/1987 | Warmath | ............. | A47G 25/485 223/91 |
| 5,318,292 A * | 6/1994 | De Marco | ............... | A44B 99/00 24/3.11 |
| 5,402,558 A * | 4/1995 | Santapa | ............... | A47G 25/485 223/91 |
| 6,804,866 B2 * | 10/2004 | Lemke | .............. | A61M 16/0683 24/3.11 |
| 8,522,826 B1 * | 9/2013 | Shih | ........................ | F16L 55/10 138/89 |
| 8,875,742 B2 * | 11/2014 | Liao | .......................... | F16B 2/10 138/89 |
| 9,136,618 B2 * | 9/2015 | Tsai | ........................ | H01R 11/24 |
| 2007/0193211 A1 * | 8/2007 | Harrison | ................ | A45C 13/08 52/750 |
| 2010/0175229 A1 * | 7/2010 | Chang | ...................... | A45D 8/20 24/530 |
| 2012/0152969 A1 * | 6/2012 | Ates | ........................ | A47G 19/06 220/735 |
| 2014/0283344 A1 * | 9/2014 | Aguero-Hernandez | ..................... | B65D 33/1675 24/545 |

* cited by examiner

*Primary Examiner* — Victor D Batson
*Assistant Examiner* — Matthew J Sullivan
(74) *Attorney, Agent, or Firm* — Guice Patents PLLC

(57) ABSTRACT

A clip of spring plate type includes a first pressing plate, a second pressing plate and a restoring elastic member. The first pressing plate includes two first lateral plates. Each of the first lateral plates has a first axial hole. The second pressing plate is assembled with the first pressing plate. The second pressing plate includes two second lateral plates. Each of the second lateral plates has a second axial hole corresponding to the first axial hole. The restoring elastic member is disposed between the first pressing plate and the second pressing plate. The restoring elastic member has a positioning portion from which two restoring arms extend. A curved portion is formed between the restoring arm and the positioning portion. The curved portion obstructs the transmission of stress so that a larger elastic force is accumulated in the restoring arm.

8 Claims, 6 Drawing Sheets

CLIP OF SPRING PLATE TYPE

BACKGROUND OF THE INVENTION

Field of the Invention

The invention relates to a clip, and more particularly to a clip of spring plate type for clamping an object.

Description of the Related Art

For personnel identification and access control management, enterprises will issue identification cards to employee for identification. To facilitate the wearing of the identification cards on the clothing, an identification sleeve and a clip for fixing the identification sleeve will be provided.

The clip typically includes a linear torsion spring structure. A common linear torsion spring structure comprising a first clipping plate, a second clipping clip, a pivot and a torsion spring. A spring force is generated through a torsion spring disposed between the clipping plates when the clipping plates are forced to rotate about the pivot so that the first clipping plate and the second clipping plate generate a clamping force to clamp an object. However, due to the slack of the torsion spring, the spring force is insufficient to clamp the object.

In the following conventional techniques, in order to improve the aforementioned structural problem, the torsion spring is replaced by a spring plate, and is also disposed between the first clipping plate and the second clipping plate, so that the spring force can exist for a long time. However, the spring plat has two spring arms which too long to generate sufficient stress in the curved and parallel sections, and the position in which the force is exerted is displaced to be more closed to a center point causing the stress to be too dispersed, resulting in insufficient elastic tension and insufficient deficiencies.

BRIEF SUMMARY OF THE INVENTION

The object of the invention is to provide a clip of spring plate type including a restoring elastic member having two restoring arms and a curved structure formed between the restoring arms. The spring force generated by the restoring elastic member becomes larger and the strength and the restoring tension are also increased due to the discontinuous surface of the restoring elastic member.

The invention provides a clip of spring plate type. The clip in accordance with an exemplary embodiment of the invention includes a first pressing plate which is a rectangular and comprises two first long lateral sides and at least one first short side, wherein a first through hole is formed on the first pressing plate near the first short side; a plurality of first lateral plates extending from the first long lateral sides, wherein each of the first lateral plates has a first axial hole, and the first axial hole on one of the first lateral plates corresponds to the first axial hole of another first lateral plate; a first engaging member disposed on an edge of the first through hole; a second pressing plate corresponding to the first pressing plate and having a shape identical to the first pressing plate, wherein the second pressing plate comprises two second long lateral sides and at least one second short side, a second through hole is formed on the second pressing plate near the second short side and corresponds to the first through hole; a plurality of second lateral plates extending from the second long lateral sides, wherein each of the first lateral plates has a second axial hole, the second axial hole corresponds to the first axial hole, and a distance between the second lateral plates is slightly larger than a distance between the first lateral plates so that the first lateral plate abuts the second lateral plate when the first pressing plate is assembled with the second pressing plate; a second engaging member disposed on an edge of the second through hole; a restoring elastic member disposed between the first pressing plate and the second pressing plate, wherein the restoring elastic member comprises a positioning portion having two ends, a restoring arm extending from each of the ends and a curved portion formed between the restoring arm and the positioning portion with being curved towards an axial direction of the positioning portion, each of the restoring arm has a hole corresponding to the first through hole and the second through hole, and the first engaging member and the second engaging member are inserted into the holes and prop against an edge of the holes when the holes align with the first through hole and the second through hole; a shaft extending through the second axial hole and the first axial hole of one side of the assembled first pressing plate and second pressing plate sequentially, through the positioning portion of the restoring elastic member and through the first axial hole and the second axial hole of the other side of the assembled first pressing plate and second pressing plate sequentially, whereby the first pressing plate, the second pressing plate and the restoring elastic member are positioned.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
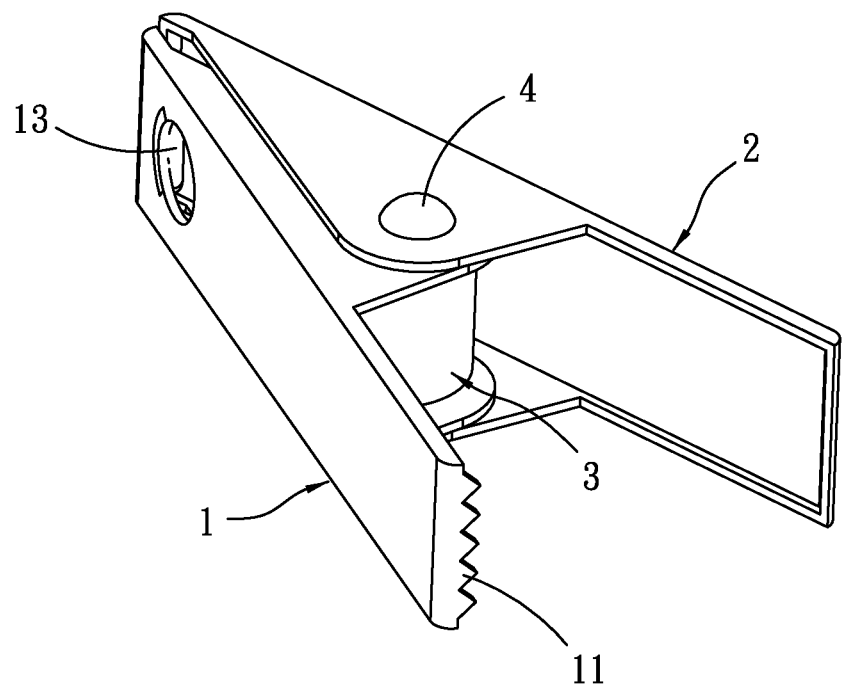
FIG. 1 is a perspective view of an embodiment of a clip of spring plate type of the invention.
Figure 2:
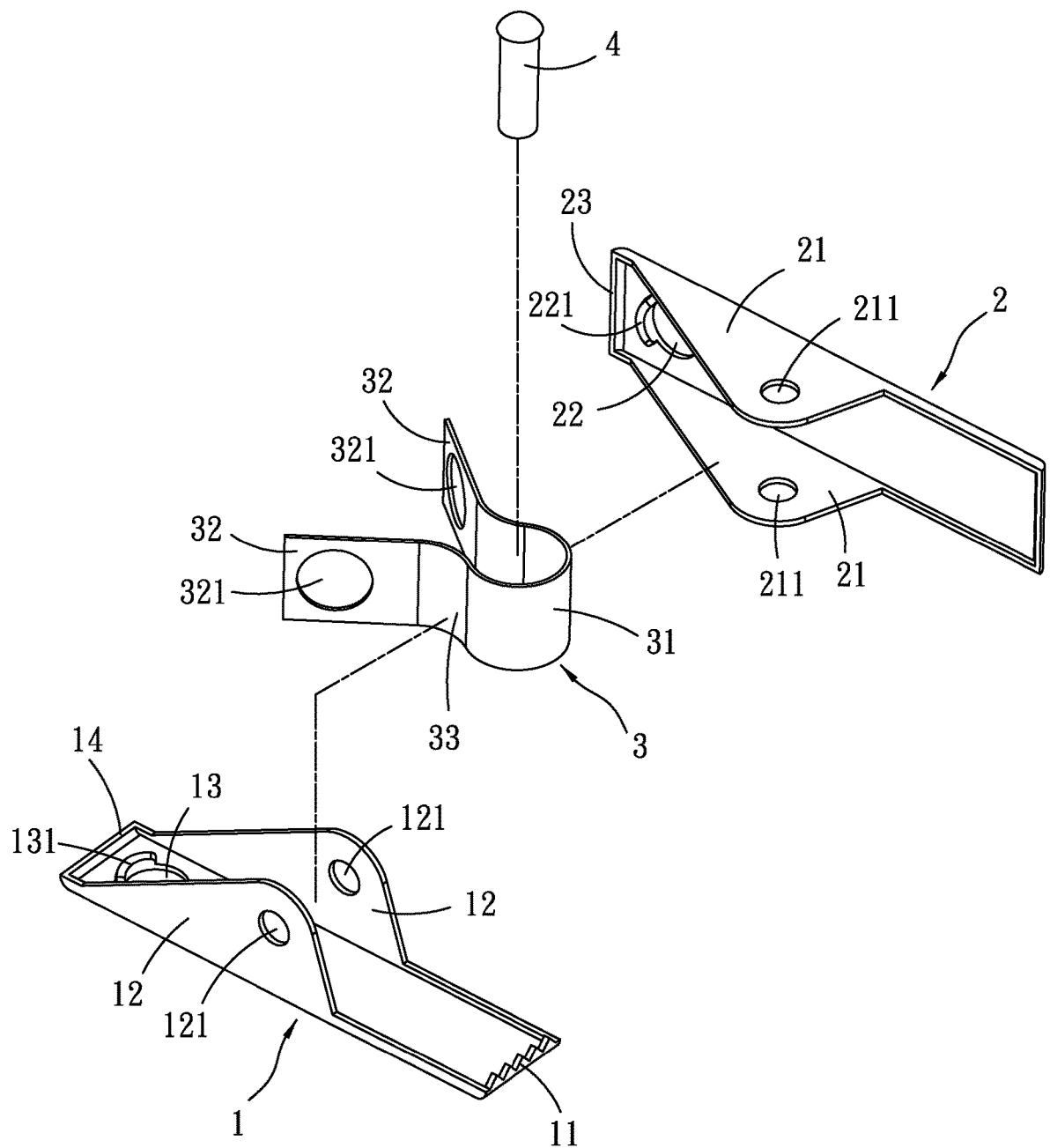
FIG. 2 is a exploded view of an embodiment of a clip of spring plate type of the invention.

Referring to FIGS. 1 and 2, a clip of spring plate type of the invention includes a first pressing plate 1, a second pressing plate 2 and a restoring elastic member 3. The first pressing plate 1 is rectangular and has two first long lateral sides and two first short lateral sides. A plurality of teeth 11 are formed on one of the short lateral sides to form a force-resistant end. In another embodiment, the teeth 11 can be replaced by a flat flange. The teeth 11 extend in a direction perpendicular to the first pressing plate 1. The clip of the invention further includes two first lateral plates 12. The first lateral plates 12 extend from the first long lateral sides of the first pressing plate 1 respectively. The first lateral plates both 12 have an identical and symmetrical shape. Each of the first lateral plate 12 has a first axial hole 121, and the positions of the first axial holes 121 corresponds to each other. In this embodiment, the first axial holes 121 align with each other. A first through hole 13 is formed on the first pressing plate 1 near the other first short side, and a first engaging member 131 is disposed at an edge of the first through hole 13 and in the vicinity of the first short side. In this embodiment, the first engaging member 131 is an one-directional protrusion with inclination. A first flange 14 is disposed on the first short side near the first engaging member 131 for structural reinforcement.

Referring to FIG. 2, the second pressing plate 2 is assembled with the first pressing plate 1. The second pressing plate 2 is rectangular and has a shape identical to the shape of the first pressing plate 1. The second pressing plate 2 has two second long lateral sides and two second short lateral sides. The clip of the invention further includes two second lateral plates 21. The second lateral plates 21 extend from the second long lateral sides of the second pressing plate 2 respectively. The second lateral plates 21 both have an identical and symmetrical shape. A distance between the second lateral plates 21 is slightly larger than a distance between the first lateral plates 12 so that the second lateral plates 21 tightly abut the first lateral plates 12 when the second lateral plates 21 is assembled with the first lateral plates 12. Each of the second lateral plates 21 has a second axial hole 211. The second axial hole 211 corresponds to the first axial hole 121 when the second lateral plates 21 is assembled with the first lateral plates 12. In this embodiment, the second axial hole 211 aligns with the first axial hole 121 when the second lateral plates 21 is assembled with the first lateral plates 12. A second through hole 22 is formed on the second pressing plate 2 near the second short lateral side, and a second engaging member 221 is disposed at an edge of the second through hole 22 and in the vicinity of the second short lateral side. In this embodiment, the second engaging member 221 is an one-directional protrusion with inclination. A second flange 23 is disposed at the second short side near the second engaging member 221.

Figure 3:
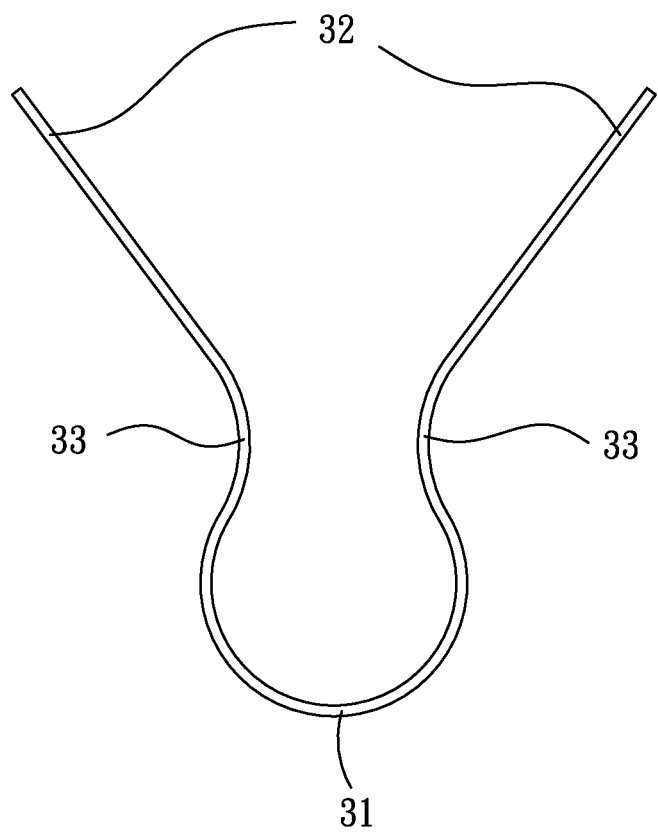
FIG. 3 is a side view of an embodiment of a restoring elastic member of the invention.

Referring to FIG. 2, the restoring elastic member 3 is disposed between the first pressing plate 1 and the second pressing plate 2. The restoring elastic member 3 is a continuous spring plate and includes a positioning portion 31. The positioning portion 31 has an annular shape and has two ends. The restoring elastic member 3 further includes two restoring arms 32. The restoring arms 32 extend from the two ends of the positioning portion 31 respectively. A curved portion 33 is disposed between the restoring arms 32 and the positioning portion 31. The curved portion 33 is curved towards an axial direction of the positioning portion 31 as shown in FIG. 3. A large angle is formed between the restoring arms 32 due to the curved portion 33. A hole 321 is formed on each of the restoring arm 32. The restoring arms 32 abut an inner surface of the first pressing plate 1 and an inner surface of the second pressing plate 2 respectively with the holes 321 aligning with the first through hole 13 and the second through hole 22 when the restoring elastic member 3 is assembled with the first pressing plate 1 and the second pressing plate 2. The first engaging member 131 and the second engaging member 221 are inserted into the holes 321 in such a manner that the first engaging member 131 and the second engaging member 221 prop against an edge of the holes 321, whereby the restoring arms 32 of the restoring elastic member 3 are positioned to the inner surface of the first pressing plate 1 and the inner surface of the second pressing plate 2 respectively. Therefore, the first flange 14 and the second flange 23 abut the edges of the restoring arms 32 to prevent the restoring elastic member 3 from being sprung out when a spring force is generated by the restoring elastic member 3. A shaft 4 extends through the second axial hole 211 and the first axial hole 121 of one side of the assembled first pressing plate 1 and second pressing plate 2 sequentially, through the positioning portion 31 of the restoring elastic member 3 and through the first axial hole 121 and the second axial hole 211 of the other side of the assembled first pressing plate 1 and second pressing plate 2 sequentially, whereby the first pressing plate 1, the second pressing plate 2 and the restoring elastic member 3 are positioned and joined together.

Figure 4:
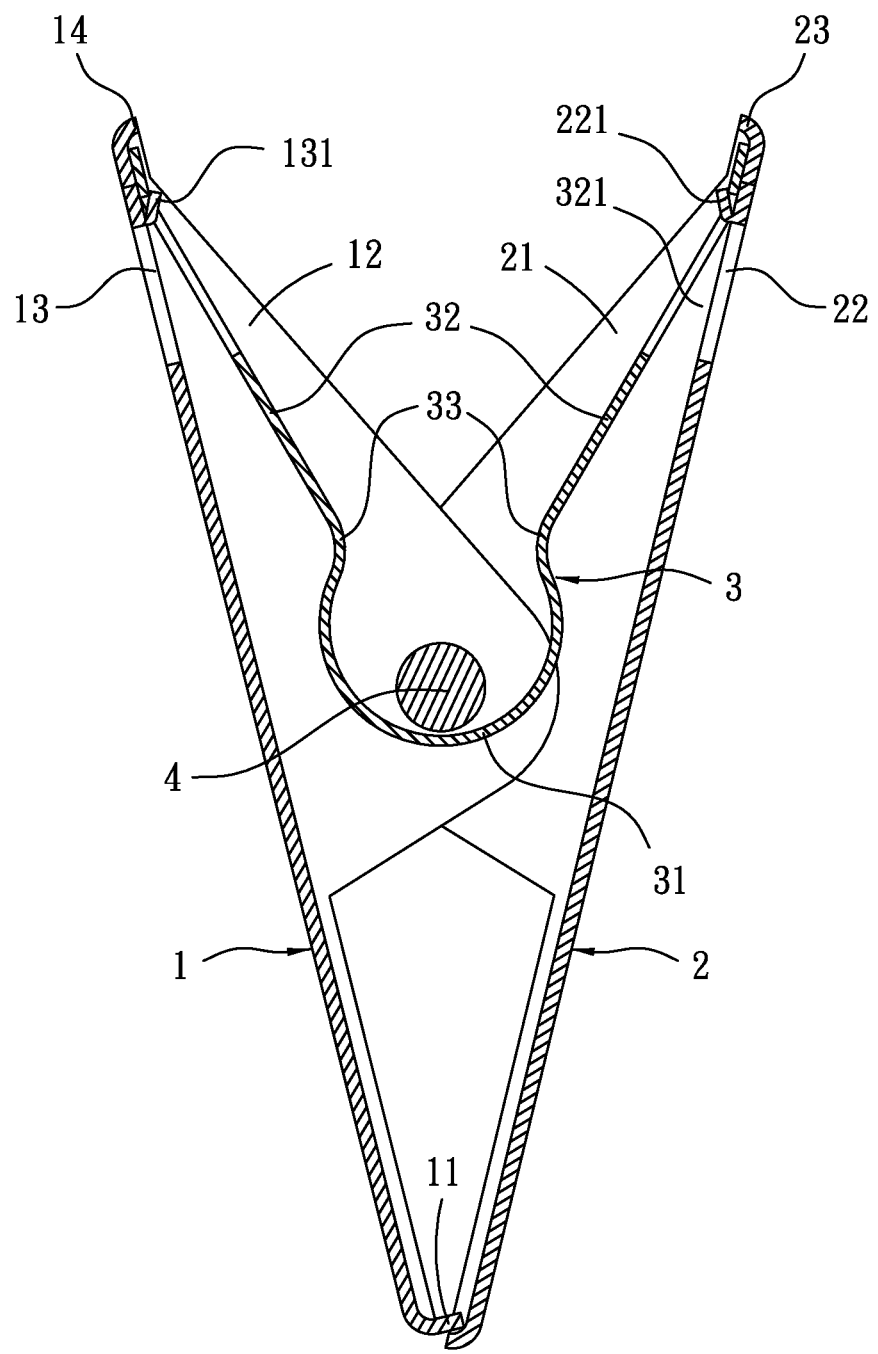
FIGS. 4 and 5 depict operation of a clip of spring plate type of the invention.
Figure 5:
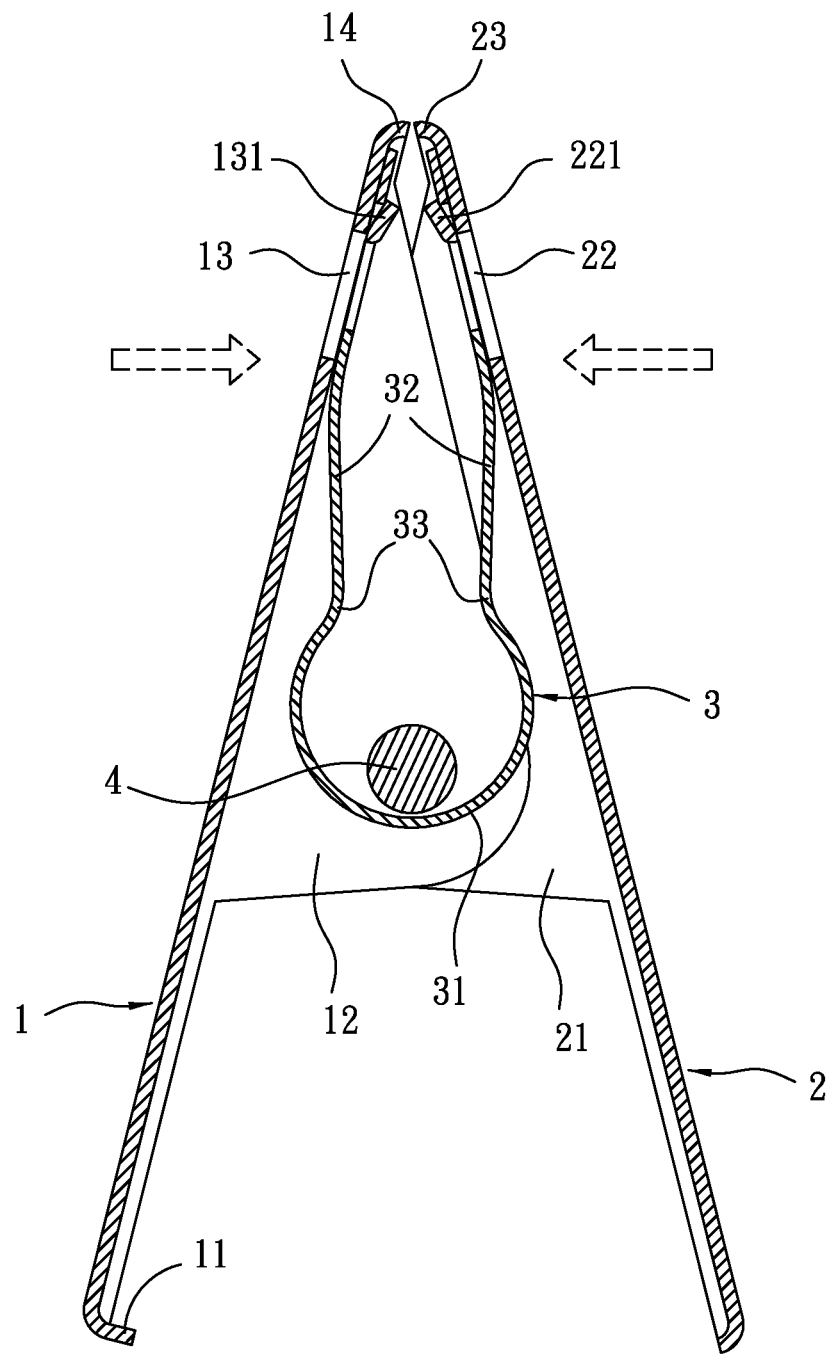

Referring to FIG. 4, the clip of the invention is not used. The first pressing plate 1 and the second pressing plate 2 are pushed by the restoring arms 32 of the restoring elastic member 3 so that the teeth 11 of the first pressing plate 1 engage the second short lateral side of the second pressing plate 2. As shown in FIG. 5, when a force is exerted on the first pressing plate 1 and the second pressing plate 2, the restoring arms 32 of the restoring elastic member 3 are pushed to move closer with each other. Since the restoring arms 32 are connected to the curved portion 33, the curved portion 33 obstructs the transmission of the spring force generated by the restoring arms 32 so that the spring force is accumulated in the restoring arms 32 and thus becomes larger than that in the structure without the curved portion 33. When the force exerted on the first pressing plate 1 and the second pressing plate 2 is removed, the spring force generated in the restoring arms 32 pushes the first pressing plate 1 and the second pressing plate 2 back to the position as shown in FIG. 4.

Figure 6:
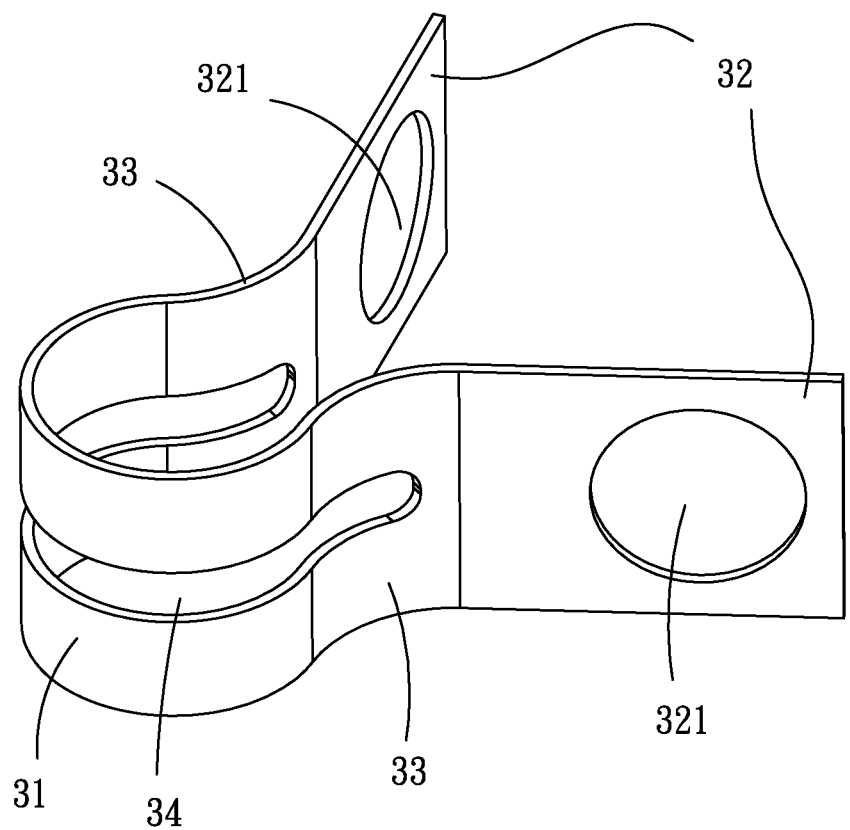
FIG. 6 is a perspective view of another embodiment of a restoring elastic member of the invention.

Referring to FIG. 6, a slot 34 is formed on the restoring elastic member 3. The slot 34 extends from a central point of the positioning portion 31 to the curved portion 33. The slot 34 destroys the continuous structure of the restoring elastic member 3 and thereby reduces the elastic deformation of the restoring elastic member 3 so that the stress in each direction is more uniform, the stress of the restoring elastic member 3 is not continuous and the elastic tension generated by the restoring elastic member 3 is not so strong.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clip of spring plate type, comprising:
   a first pressing plate which is a rectangular and comprises two first long lateral sides and at least one first short side, wherein a first through hole is formed on the first pressing plate near the first short side;
   a plurality of first lateral plates extending from the first long lateral sides, wherein each of the first lateral plates has a first axial hole, and the first axial hole on one of the first lateral plates corresponds to the first axial hole of another first lateral plate;
   a first engaging member disposed on an edge of the first through hole;
   a second pressing plate corresponding to the first pressing plate and having a shape identical to the first pressing plate, wherein the second pressing plate comprises two second long lateral sides and at least one second short side, a second through hole is formed on the second pressing plate near the second short side and corresponds to the first through hole;

a plurality of second lateral plates extending from the second long lateral sides, wherein each of the second lateral plates has a second axial hole, the second axial hole corresponds to the first axial hole, and a distance between the second lateral plates is slightly larger than a distance between the first lateral plates so that the first lateral plate abuts the second lateral plate when the first pressing plate is assembled with the second pressing plate;

a second engaging member disposed on an edge of the second through hole;

a restoring elastic member disposed between the first pressing plate and the second pressing plate, wherein the restoring elastic member comprises a positioning portion having two ends, a restoring arm extending from each of the ends and a curved portion formed between the restoring arm and the positioning portion with being curved towards an axial direction of the positioning portion, each of the restoring arm has a hole corresponding to the first through hole and the second through hole, and the first engaging member and the second engaging member are inserted into the holes of each said restoring arm and prop against an edge of the holes when the holes of each said restoring arm align with the first through hole of the first pressing plate and the second through hole of the second pressing plate, respectively;

a shaft extending through the second axial hole and the first axial hole of one side of the assembled first pressing plate and second pressing plate sequentially, through the positioning portion of the restoring elastic member and through the first axial hole and the second axial hole of the other side of the assembled first pressing plate and second pressing plate sequentially, whereby the first pressing plate, the second pressing plate and the restoring elastic member are positioned.

2. The clip of spring plate type as claimed in claim 1, wherein the first lateral plates have an identical and symmetrical shape; the second lateral plates have an identical and symmetrical shape.

3. The clip of spring plate type as claimed in claim 1, further comprising a first flange formed on the first short side.

4. The clip of spring plate type as claimed in claim 1, further comprising a second flange formed on the second short side.

5. The clip of spring plate type as claimed in claim 1, wherein the restoring elastic member is a continuous spring plate.

6. The clip of spring plate type as claimed in claim 1, wherein the positioning portion has an annular shape.

7. The clip of spring plate type as claimed in claim 1, wherein restoring elastic member comprises a slot.

8. The clip of spring plate type as claimed in claim 7, wherein the slot extends from a central point of the positioning portion to the curved portions.

* * * * *